United States Patent [19]

Mummert

[11] 4,181,118
[45] Jan. 1, 1980

[54] SOLAR HEATING SYSTEM

[76] Inventor: Harold B. Mummert, 508 Peterson St., Fort Collins, Colo. 80524

[21] Appl. No.: 771,969

[22] Filed: Feb. 25, 1977

[51] Int. Cl.² ............................................ F24J 3/02
[52] U.S. Cl. .................................. 126/429; 126/400
[58] Field of Search ..................... 126/400, 270, 271; 237/1 A; 52/596, 605

[56] References Cited

U.S. PATENT DOCUMENTS

| 246,626 | 9/1881 | Morse | 126/270 |
| 2,595,905 | 5/1952 | Telkes | 126/270 |
| 2,677,367 | 5/1954 | Telkes | 126/270 |
| 3,243,117 | 3/1966 | Morgan | 126/270 |
| 3,288,206 | 11/1966 | Beeler | 126/270 |
| 3,832,992 | 9/1974 | Trombe et al. | 126/270 |
| 3,875,925 | 4/1975 | Johnston | 126/270 |
| 3,955,555 | 5/1976 | Bostrom | 126/270 |
| 4,046,133 | 9/1977 | Cook | 126/270 |

FOREIGN PATENT DOCUMENTS

| 2274879 | 1/1976 | France | 126/270 |
| 2303250 | 10/1976 | France | 126/270 |
| 387828 | 2/1933 | United Kingdom | 126/270 |

*Primary Examiner*—James C. Yeung
*Attorney, Agent, or Firm*—Richard W. Hanes

[57] ABSTRACT

A climate control system for heating and cooling a building. The system uses solar energy for its heat source and concrete blocks for its collecting and storing material. The blocks are open faced and positioned to receive the radiation directly. An insulating enclosure is restrictably positioned to expose the blocks to the sun's radiation during the day and to enclose the blocks in the evening to trap the heat for later use. The system uses both natural and forced convection currents to transfer the heat to and from the building. In a preferred embodiment, an upper compartment with a transparent roof is built above the blocks. This compartment is comparatively small and heats quickly to high temperatures. Water pipes of the building heating system can be placed in this compartment and the heated air can be routed into the building or transmitted through a duct to the bottom of the concrete blocks to heat them. The upper compartment is particularly useful in the morning because the sun strikes it first and the heat produced can be used in the house or transmitted to the blocks to begin heating them before the sun is high enough to strike them. In addition to the insulation, the invention includes secondary walls on the exposure side of the collector, comprising transparent panels in the winter and screen louvered openings in the summer. Radiation passing through the transparent panels strikes the blocks and a hot house effect is created. When the night air is relatively cool and the days are hot, the insulating enclosure can be opened at night to pass cool air into the system to lower the temperature of the blocks so they can absorb heat from the building during the day.

5 Claims, 6 Drawing Figures

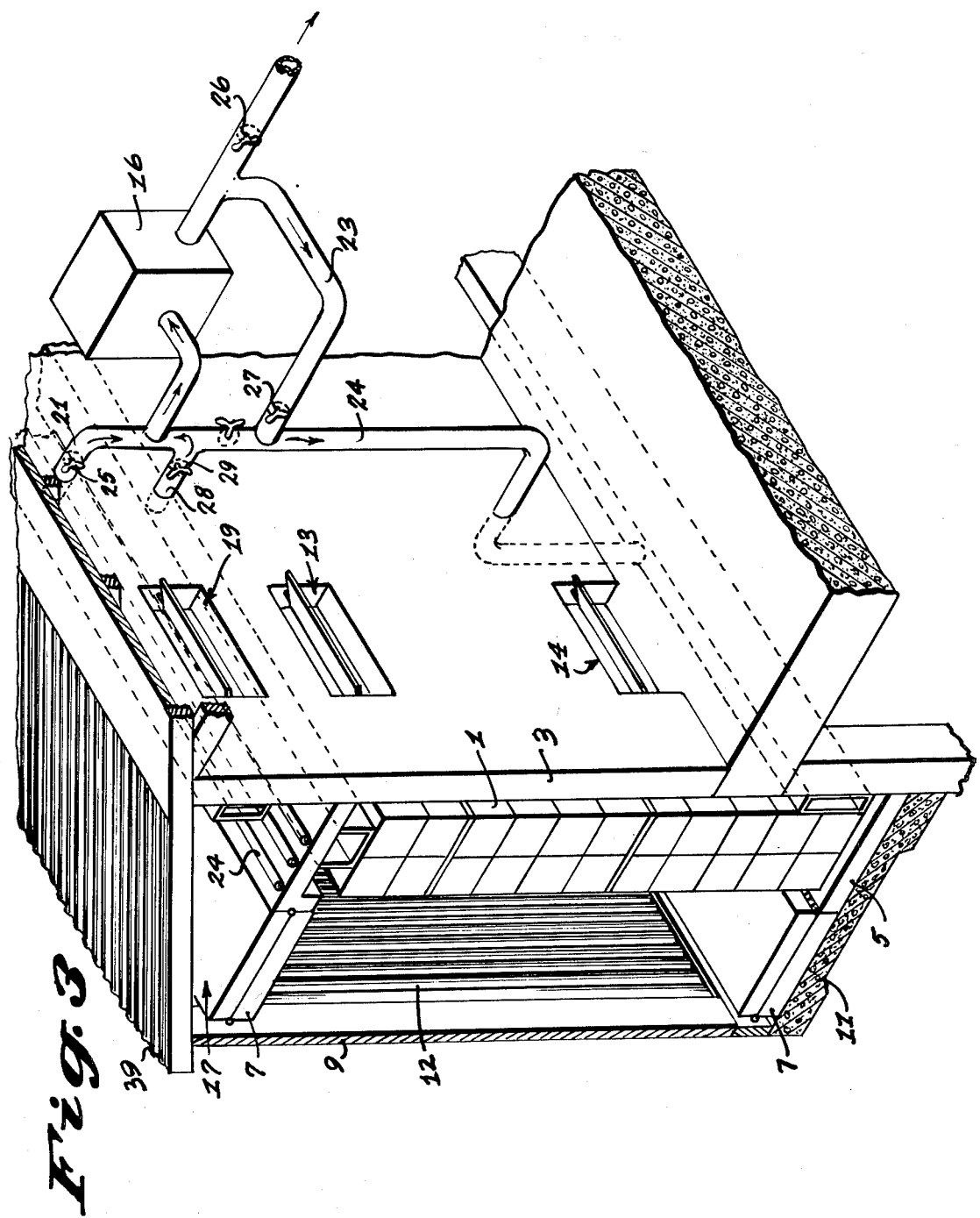

SOLAR HEATING SYSTEM

BACKGROUND OF THE INVENTION

Solar energy is becoming increasingly important as an abundant, free, and non-polluting heat source for climate control systems. It is especially adaptable to heating and cooling systems used in residential, commercial, and industrial buildings. In the heating mode of such systems, radiation from the sun is absorbed and stored to be used as needed to heat the building. In the cooling mode, the procedure is reversed so that heat is absorbed from the building and transmitted to the outside.

Solar heating systems can be active, passive, or a combination of the two. Passive systems use no external sources of power and rely on convection, conduction, and radiation to transfer to heat. In such systems, the sun often shines directly on the storage material so that the collection and storage of heat occur at the same time and place. Active systems use such expedients as fans and pumps to transfer the heat. These systems are often very elaborate and involve collecting the radiation at one place and storing the heat in another place. Typically, water or air is circulated on the roof of a building to absorb heat and then pumped to a storage area in the building. Most commercial solar heating systems are active and use fans or pumps.

OBJECTS OF THE INVENTION

It is an object of this invention to provide a climate control system that uses solar energy as its heat source.

It is also an object to provide a climate control system that is inexpensive, easily installed, relatively maintenance free, and adaptable to home and commercial use. The system can be added easily to existing buildings with a minimum of delay and cost.

It is further an object to provide a climate control system that can be used to heat or cool a building.

BRIEF DESCRIPTION OF THE DRAWINGS

FIG. 3 is a perspective view of the system of FIG. 2 showing the pipes of the water heating system in the upper compartment and the forced air system.

DETAILED DESCRIPTION OF THE INVENTION

Figures 1, 2:
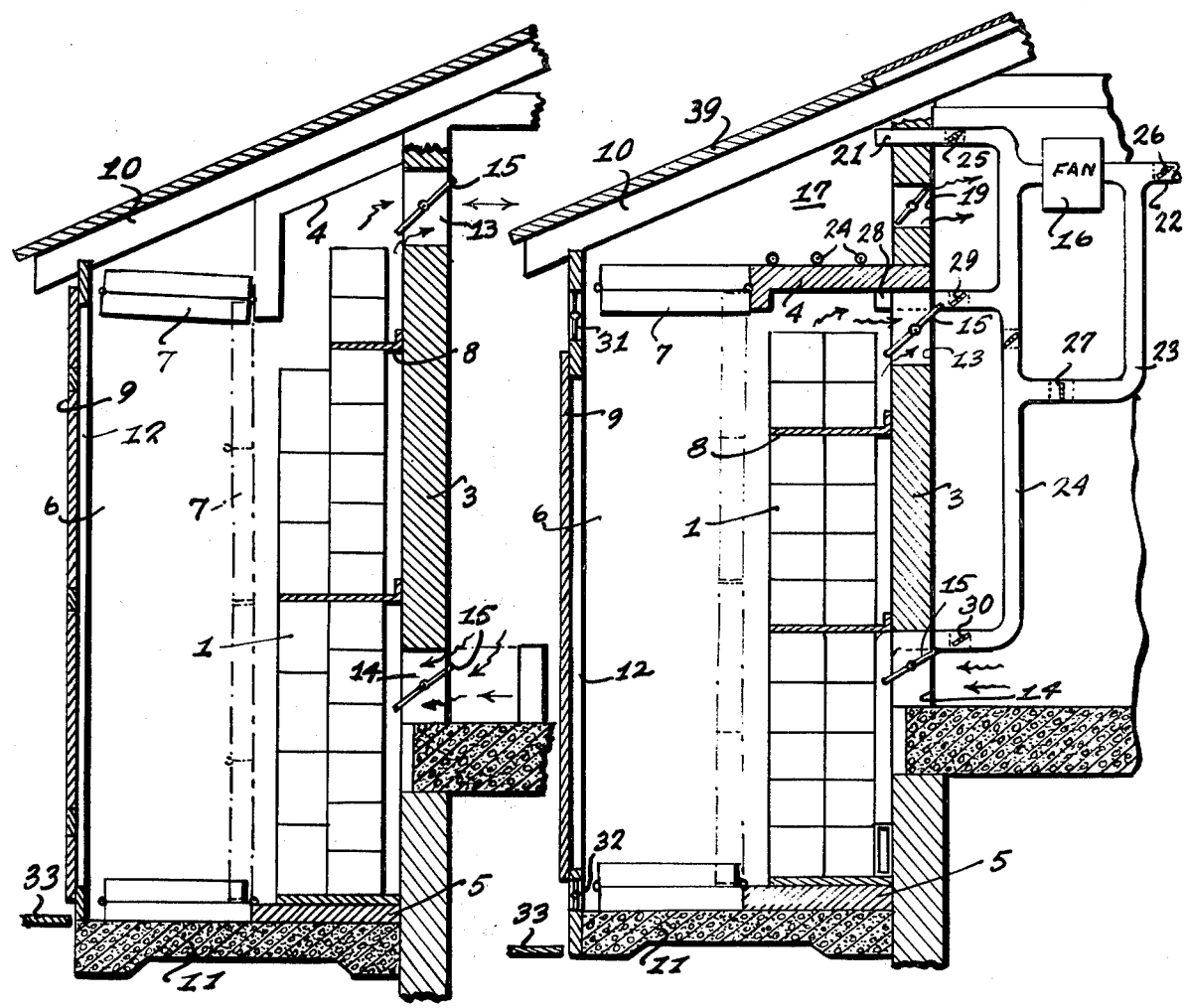
FIG. 1 is a cross-sectional view of the basic unit of the solar heating system. In this relatively passive system, concrete blocks directly absorb radiation from the sun. A movable insulating means is shown in phantom lines as postionable to trap the heat of the blocks in the area immediately surrounding the blocks.
FIG. 2 is a cross-sectional view of a modified system in which an upper compartment is added to the system of FIG. 1 and the convective air circulation of FIG. 1 is modified to forced air system.

As seen in FIG. 1, concrete blocks 1 are stacked atop each other in an area consisting of wall 3 of the house, top portion 4, floor 5, a portion of side walls 6, (only the far wall 6 is shown), and selectively movable insulating panels 7. The panels 7 are pivotally mounted and movable so that the area immediately surrounding the concrete blocks 1 can be either enclosed to trap the heat in or opened to permit heat to be transmitted into or out of the block area. No mortar is used between the blocks 1 and wooden shelves 8 mounted on the wall 3 help to hold the stacks in place.

A wall frame 9 is positioned on the exposure side of the insulating panels 7. In winter, the wall frame 9 serves to mount or support a transparent or translucent protective covering such as corrugated fiberglass 12, it being preferred because of its strength and energy transmitting properties. During summer operation, the fiberglass wall panel 12 may be replaced with fixed screen louvers.

Convection currents passing through the vents 13 and 14 in the wall 3 are controlled by louvers 15 which can be operated by hand or by a thermostat. In the FIG. 2 embodiment, the fan 16 serves to supplement the natural flow of the convection currents in the system.

In operation, the movable panels 7 of the insulating enclosure are placed in the positions shown in full lines in FIG. 1. Sunlight passing through the pane 12 strikes the concrete blocks 1 and heats them. The louvers 15 of the vents 13 and 14 are closed and the space enclosed within members 3, 6, 10, 11 and 12 begins to heat. When heat is desired in the house, louvers 15 are opened and a convection current is created between the house and the area of the concrete blocks 1. In the FIG. 2 embodiment, the fan 16 can be operated to intensify the current to bring more heat into the house through the upper vent 13 and drive more cold air out of the house through the lower vent 14. This is the heating mode of operating of the system when the sun is out.

When the concrete blocks 1 become sufficiently hot, or when the sunlight is fading, the movable panels 7 are closed as shown in phantom lines in FIG. 1 to trap the heat present in the space immediately surrounding the concrete blocks 1. This is the mode of heating operation at night during the winter when heat will be needed in the house.

In FIGS. 2 and 3, the system of FIG. 1 is modified to include an upper compartment 17 above the top portion 4 of the insulating block enclosure. Further, the normal roof 10 of the system of FIG. 1 is modified to include a roof portion 39 that is transparent or translucent to pass radiation into the compartment 17. The compartment 17 is smaller than the area around the blocks and the air in the compartment heats faster and to much higher temperatures. When the movable portions 7 are in their open position as shown in solid lines in FIG. 2, the hottest air in the system will be present in the upper compartment 17 which can be released through the vent 19 into the house or drawn by the fan 16 through the upper duct 21 and blown into the house through a plenum duct 22, or blown downwardly into the concrete blocks 1 through ducts 23 and 24 to supplement the heating of the concrete blocks 1.

If the system faces the south, morning sunlight will first strike the upper compartment 17. This early heat can be supplied to the house or blown downwardly through duct 23 to begin heating the blocks 1 before the sun can strike them directly. In a like manner, the late evening sun will fall on the upper compartment 17 last. The temperatures in the upper compartment 17 of the system are high enough to make it practical to install a water heating system comprising pipes 24 in which the water becomes heated.

The bottom portion of the duct 24 extends along the length of the blocks 1 and has several holes in it along its length. Duct 28 with valve 29 connects the top region of the blocks 1 with the duct 24. Duct 24 is also valved at 30. Vent means 31 and 32 as seen in FIG. 2 allow air to pass into and out of the system.

When the sun is shining and heat is required in the house, the lower vent 14, vents 13 and 14, valve 25, and valve 26 are opened. The fan 16 draws hot air from the upper compartment 17 and forces it through the plenum duct 22 into the house. A natural convection current is set up between the vents 13, 14 and 19. If the sun is shining but no heat is required in the house, the vents 13, 14 and 19 are closed and valves 25, 27 and 30 are opened to circulate hot air from the upper compartment 17 to the lower region of the blocks 1. During the night, the movable panels 7 are positioned to enclose the blocks 1 and vent means 13 and 14 as well as valves 29 and 26 are opened. The fan 16 draws stored heat energy from the top region of the blocks 1 and forces it through duct 22. A natural convection current is set up between the vents 13 and 14.

For cooling, the movable panels 7 are opened as is the upper vent 13 and valves 26 and 30. The fan 16 draws cool air from the lower region of the blocks 1 through duct 24 and forces it into the house through duct 22. Hot air from the house enters the area of the blocks 1 through the upper vent 13. To cool the blocks 1 at night, the movable panels 7 and outside vents 31 and 32 are opened to pass cool night air into the system.

In summer operation where the dew-point temperature is low, the unit can be fed by an evaporative cooler which blows cool air into the blocks. The moist air from the cooler would not enter the house but would only cool the mass of blocks.

The operation of the components of the above systems can be manual or automatic. Further, the described modes of operation are preferred ones. Other modes can be devised to adapt the systems to the peculiarities present in each building.

Figure 4:
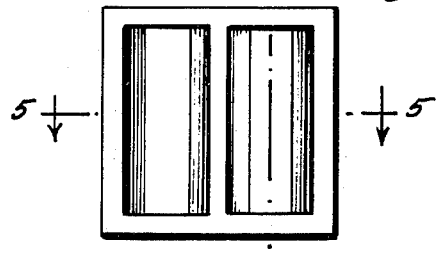
FIG. 4 is a frontal view of the preferred design for the concrete blocks to be used as the collecting and storage material in the systems.
Figure 5:
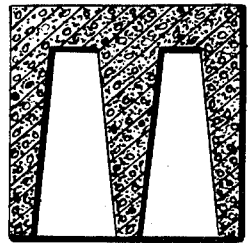
FIG. 5 is a view taken along line 5—5 of FIG. 4.
Figure 6:
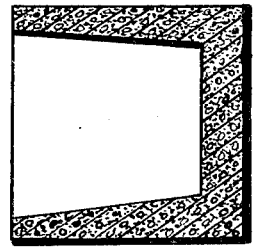
FIG. 6 is a view taken along line 6—6 of FIG. 4.

FIGS. 4–6 show the preferred design of the concrete blocks 1 used in the systems to collect and store heat. The blocks have a large, internal surface area and are positioned with their openings facing the source of radiation. Eight and twelve-inch concrete blocks have been successfully used. While concrete blocks painted black are preferred, poured concrete walls with extended surfaces and fins as well as rocks of two to four-inch diameters held in position by steel mesh can also be used as the collecting and storing material. The collecting and storing material preferably has a large area exposed to the radiation and thin sections to quickly absorb and disburse the heat. A material with a large surface area to volume ratio works the best.

The movable panels 7 of the insulating enclosure are preferably made of rigid foamed plastic with good structural properties. They can be folded vertically or horizontally in an accordian type design or individually mounted.

A reflecting surface 33 can be placed on the ground in front of the systems as shown in FIGS. 1 and 2. This is an effective and low cost method of increasing the radiation received by the blocks 1. The surface 33 is preferably a thin aluminum sheet or aluminized plastic film. Snow also makes an excellent reflecting surface.

I claim:

1. A climate control system adapted to be used with an intermittent source of solar radiation for altering the temperature of a building interior, said system comprising:
    storage means including material capable of absorbing the radiation from said source and positioned in the path of said radiation,
    insulating means disposed to form a retractile enclosure around storage material, including:
        at least one movable portion retractably positionable so that said insulating means encloses said storage material when said movable portion is in one position and said insulating means exposes said storage material to radiation when said movable portion is in a second position; and
        further including a second wall portion positioned between said storage material and the building interior, said second wall portion having at least two vent means, each of said vent means defining a passage through said second portion between the storage material and said interior and including control means for selectively opening and closing said passage, said passages being vertically spaced from each other so that when said vent means are open and there is a temperature differential between the storage material and the building interior, a convection current is set up between the area of the storage material and the interior of the building.

2. The climate control system of claim 1 wherein:
    said storage material includes a plurality of block members stacked atop each other, each of said block members having sides defining at least one opening into said block member, and said plurality of block members being positioned with said opening substantially facing the radiation source.

3. The climate control system of claim 2 wherein:
    said insulating means includes a top portion,
    compartment means including members forming a substantially enclosed space above said top portion, one of said members being substantially transparent and positioned facing the radiation source, and
    air conveying means including a duct extending from said substantially enclosed space to an area adjacent the bottom of the stacked storage material, said conveying means further including pump means to move air through said duct whereby the fluid in the substantially enclosed space above said top portion is heated by said radiation source and moved by said conveying means to the area adjacent the bottom of said storage material.

4. A passive solar energy collection and heating system for the interior of a building having exterior walls, comprising:
    a first compartment having top and bottom members and side walls, one of which side walls is common with one of the said exterior walls of the building and at least one other of said side walls being transparent to radiant solar energy,
    second compartment means contiguous to said first compartment and having at least one wall member which is transparent to radiant solar energy and having one wall member which is common to the said exterior building wall;
    closeable vent means disposed in said common wall and interconnecting the interior of the building and said second compartment means,
    means including a concretion of mineral matter characterized by its ability to absorb and store heat energy disposed in the said first compartment, and upper and lower closeable vent means disposed in said common wall and interconnecting the interior of the building and said first compartment.

5. The combination of claim 4 and further including retractable divider means disposed to selectively divide said first compartment into two sub-compartments, one of which sub-compartments contains the said mass of heat absorbing material.

* * * * *